March 27, 1956 R. HERTZ 2,739,509
MULTI-DIRECTIONAL VIEWER FOR VEHICLES
Filed July 6, 1950 2 Sheets-Sheet 1

INVENTOR.
RICHARD HERTZ
BY Jay C. Taylor
ATTORNEY

March 27, 1956 R. HERTZ 2,739,509
MULTI-DIRECTIONAL VIEWER FOR VEHICLES
Filed July 6, 1950 2 Sheets-Sheet 2
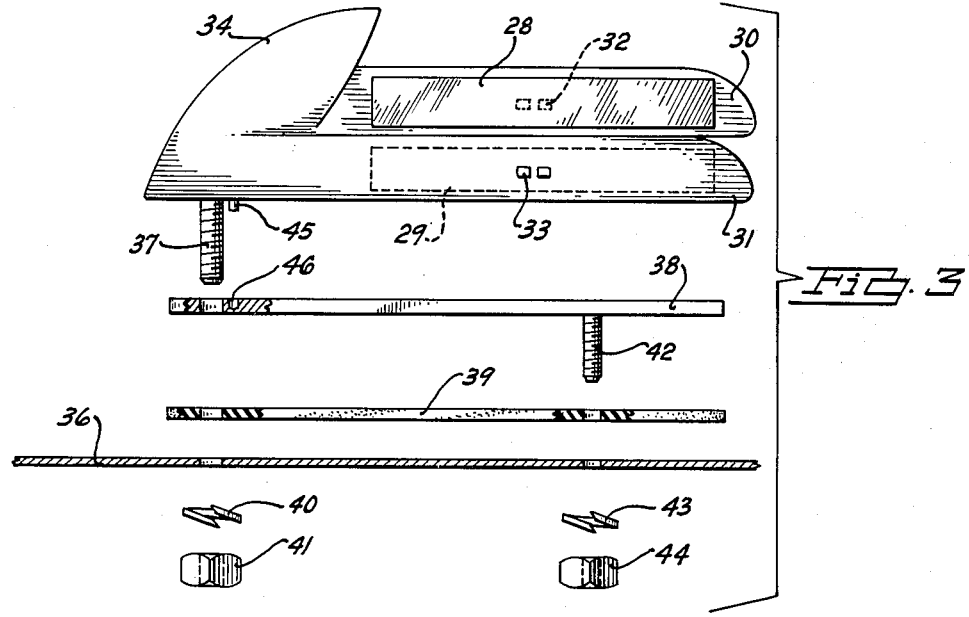
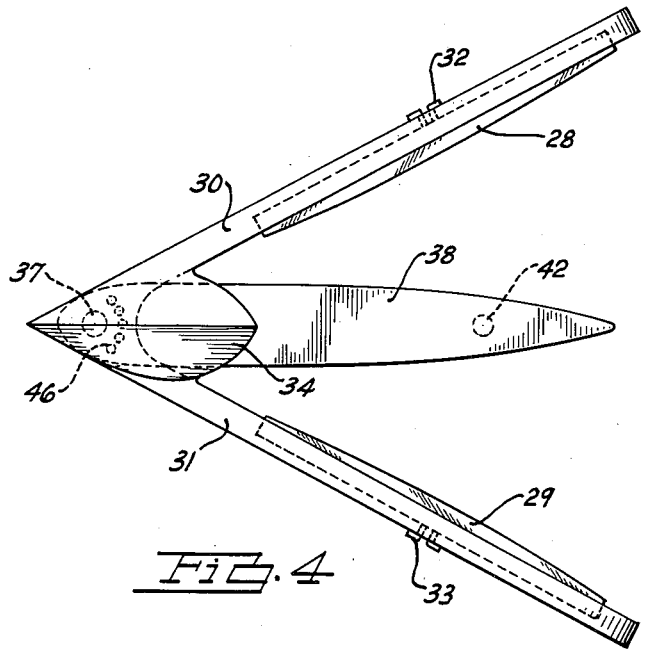
INVENTOR.
RICHARD HERTZ
BY
Jay C. Taylor
ATTORNEY

United States Patent Office 2,739,509
Patented Mar. 27, 1956

2,739,509

MULTI-DIRECTIONAL VIEWER FOR VEHICLES

Richard Hertz, Detroit, Mich.

Application July 6, 1950, Serial No. 172,255

3 Claims. (Cl. 88—36)

This invention relates to a novel combination of hood and fender ornaments for motor vehicles which possess utility in that they permit the driver to see simultaneously approaching vehicles at intersections and vehicles behind the driver by looking into a multi-directional viewer placed on the hood of the vehicle. At present a driver at an intersection must look to the left, to the right, behind, and forward before crossing the intersection. Frequently the visibility to the right and left is obscured by parked vehicles, shrubs, signs, etc. and the driver must project his vehicle into the line of traffic before he can see oncoming vehicles. This is a dangerous and time-consuming condition. Also at present mirrors are placed in such position that the driver must take his eyes off the road ahead to look into the mirrors, which is a dangerous procedure.

Three important objects of the multi-directional viewer are, first, to insure good visibility at obstructed intersections while vehicle is out of the line of oncoming traffic; second, to remove the necessity of the driver taking his eyes off the road ahead; third, to permit the driver to see simultaneously in four directions while looking forward. Other objects are to devise a simple reflective viewer which will be ornamental, inexpensive, easy to install, adjustable for different sized cars, and have a wide field of vision and high degree of clarity.

For the attainment of these and other objects, embodiments of the invention are shown in the accompanying drawing wherein:

Figure 3 is an exploded side view showing the central viewer and its method of attachment.

Figure 4 is a top plan view of the central viewer.

Figure 2:
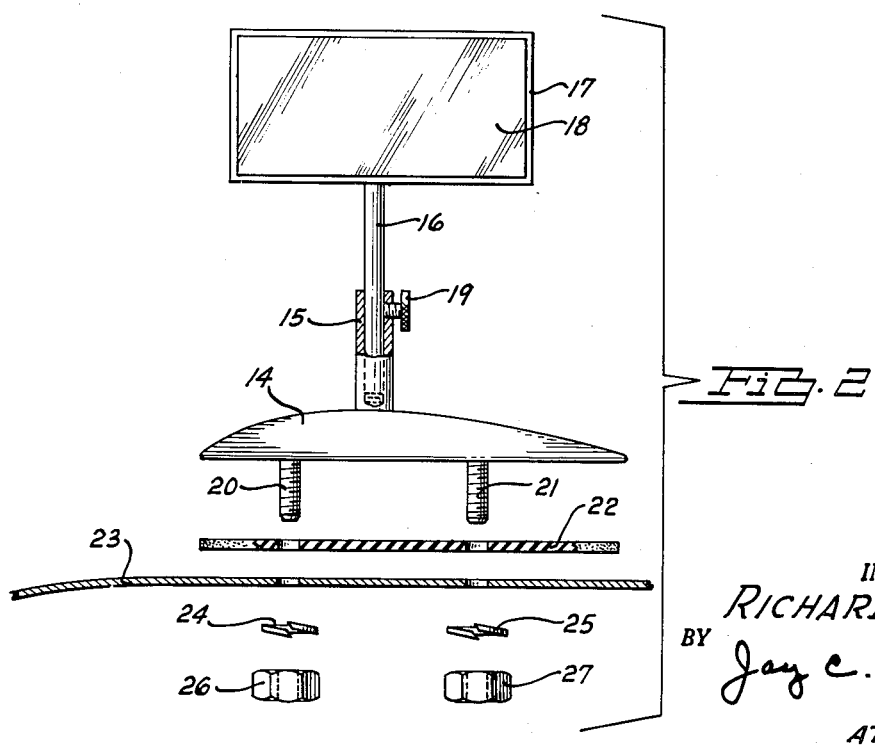
Figure 2 is an exploded side view showing the right or left side viewer and its method of attachment to vehicle.

In Fig. 2 the base 14 holds the hollow cylinder 15 in which rides the upright 16, holding the frame 17, which contains the mirror 18. The upright is adjusted in the hollow cylinder for height and angle by means of the adjusting screw 19. The base 14 is fastened to vehicle by means of bolts 20 and 21 through rubber gasket 22, through fender 23 and lock washers 24 and 25, to nuts 26 and 27.

Referring to Figures 3 and 4, the convex curved mirrors 28 and 29 are held respectively to arms 30 and 31 by clips 32 and 33. The two arms are placed at an acute angle to each other, with one placed at a higher elevation than the other, and joined by the integral wind deflector 34 which makes up the frame 35. This frame is fastened to hood of vehicle 36 by bolt 37 through base 38 and through rubber gasket 39 to lock washer 40 and nut 41. The base 38 is also fastened to hood by bolt 42 through gasket 39 and lock washer 43 to nut 44. The frame 35 may be manually locked at various angles by inserting pin 45 into one of holes 46.

Figure 1:
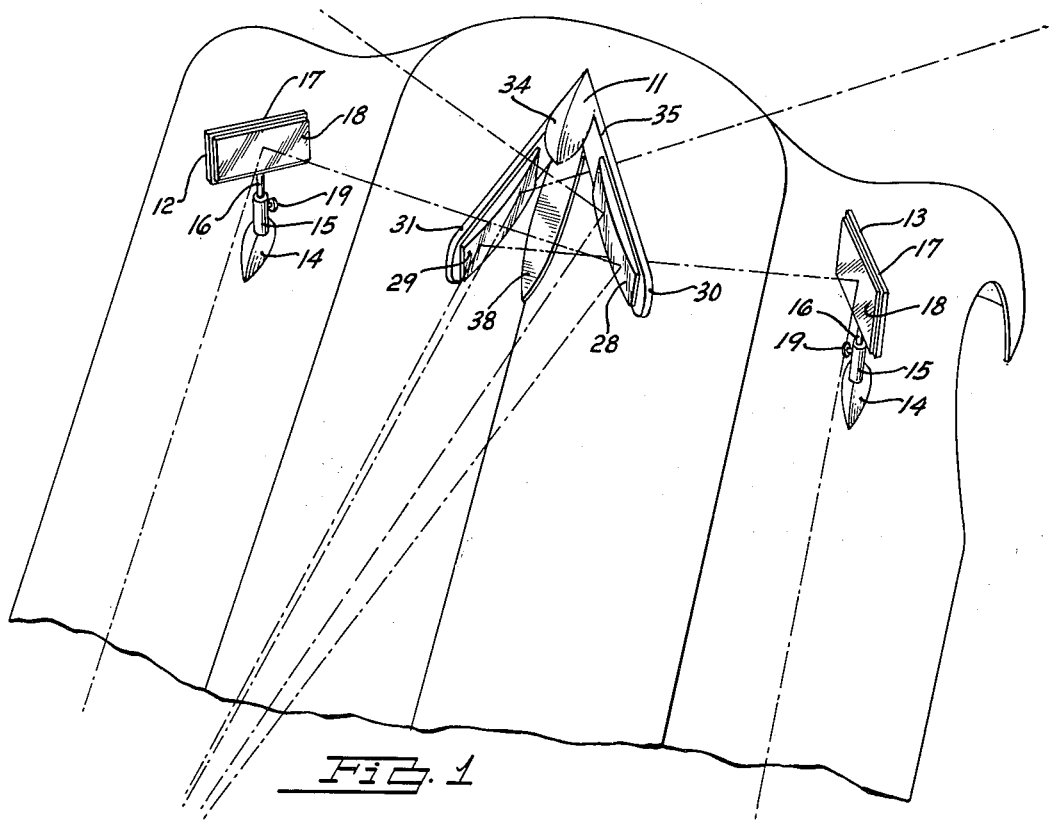
Figure 1 is a fragmentary perspective view of the multi-directional viewer attached to a vehicle.

Referring to Fig. 1, it is apparent that looking into central viewer 11 affords a view of cross traffic, and by focusing the images from left-side viewer 12 and right-side viewer 13 into a portion of the central viewer, a view of right and left rear is also seen in the central viewer. Thus it is possible by looking forward to see in four directions simultaneously. It is apparent that numerous changes in the details of construction and in the combination, number, and arrangement of parts may be resorted to, without departing from the scope or spirit of the invention as hereinafter claimed.

I claim:

1. In a vehicle attachment of the class described, the combination of four mirrors, including two side mirrors and two central mirrors adjusted so that the left-hand side mirror reflects into the right-hand central mirror and the right-hand side mirror reflects into the left-hand central mirror and then to the driver's eyes, said central mirrors being held in a wind-deflecting frame comprising two arms at approximately fifty-five degree angle to each other, one higher in elevation than the other, and perpendicular to the horizontal, said frames being adjustably locked in position by pin-and-sockets to bases, said side mirrors being mounted on each of the front portions of the vehicle in a frame attached to an upright riding in a hollow cylinder with adjusting screw, said bases are vibration damped by rubber gaskets and fastened to vehicle by bolts.

2. In a vehicle attachment of the class described, the combination of four mirrors including two side mirrors and two central mirrors, said central mirrors being held in a wind deflecting frame comprising two arms at approximately fifty-five degrees angle to each other, one higher than the other in elevation, and perpendicular to the horizontal, said frames being adjustably locked in position by pin-and-sockets to bases, which are vibration damped by rubber gaskets and fastened to vehicle by bolts, said side mirrors being each held in a frame attached to an upright in a hollow cylinder with adjusting screw so that the left-hand side mirror reflects into a right-hand central mirror, and the right-hand side mirror reflects into the left-hand central mirror and thence to the driver's eyes.

3. In a vehicle attachment of the class described, the combination of four mirrors, comprising two side mirrors and two central mirrors, said central mirrors being held in a wind-deflecting frame, and being at an acute angle to each other, one higher than the other in elevation, and substantially perpendicular to the horizontal, said frame being adjustably mounted on the front central portion of the vehicle, said side mirrors being mounted on each of the front side portions respectively of the vehicle at such an angle that the left-hand side mirror reflects into one of the central mirrors and the right-hand side mirror reflects into the other central mirror and thence to the driver's eyes.

References Cited in the file of this patent

UNITED STATES PATENTS

| 1,547,794 | Curry | July 28, 1925 |
| 2,161,777 | Sarnes | June 6, 1939 |
| 2,261,940 | Palmer | Nov. 11, 1941 |

FOREIGN PATENTS

| 18,472 | Great Britain | Aug. 4, 1910 |
| 201,347 | Great Britain | Aug. 2, 1923 |
| 38,771 | France | July 18, 1931 |
| | (1st addition to No. 687,194.) | |
| 380,146 | Great Britain | Sept. 15, 1932 |
| 517,716 | Great Britain | Feb. 7, 1940 |
| 98,218 | Sweden | Feb. 27, 1940 |